United States Patent Office 2,849,868
Patented Sept. 2, 1958

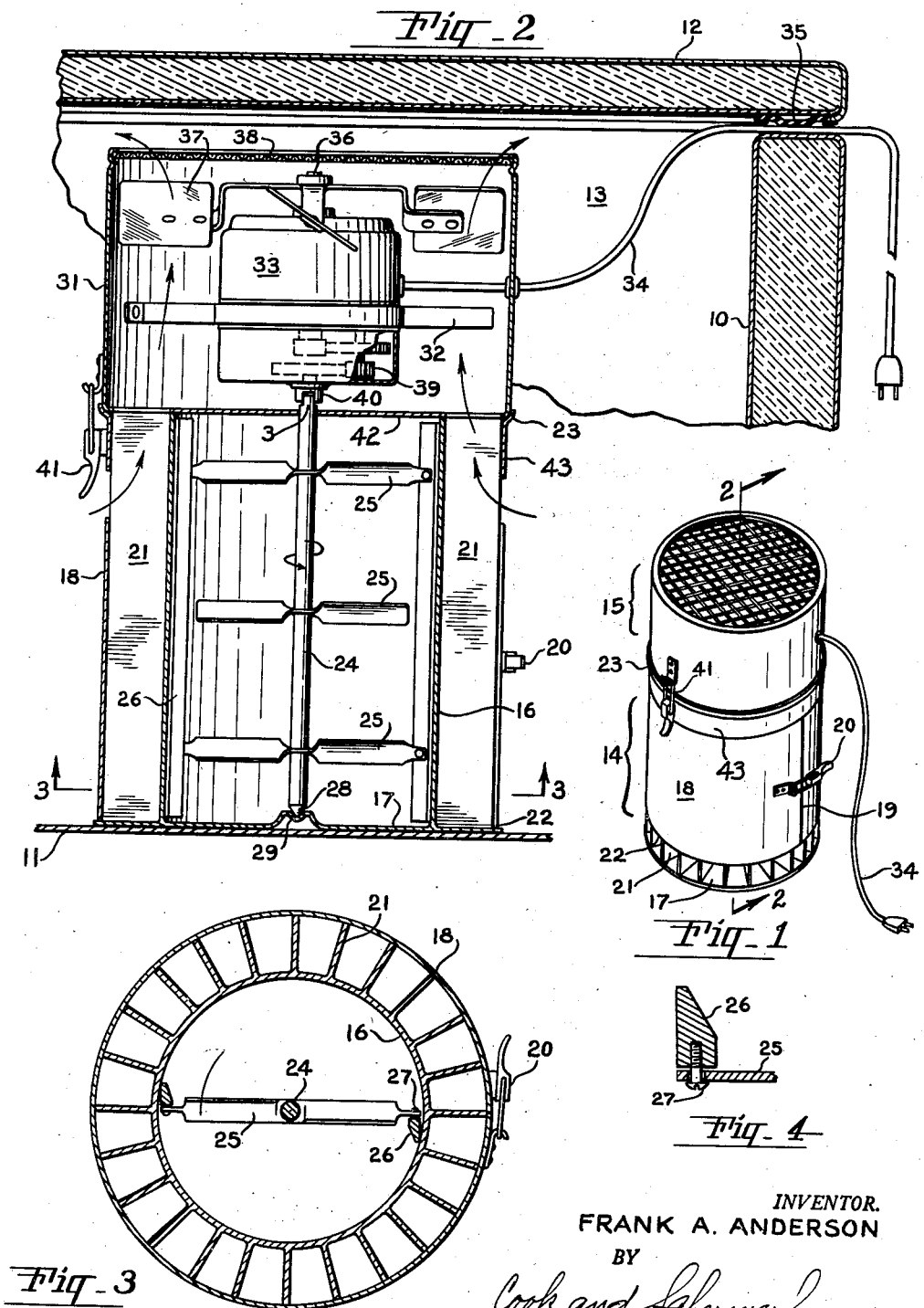

2,849,868

ICE CREAM FREEZER FOR USE IN A REFRIGERATED COMPARTMENT

Frank A. Anderson, Portland, Oreg.

Application September 10, 1956, Serial No. 608,837

6 Claims. (Cl. 62—342)

This invention relates generally to an improved ice cream freezer and particularly to a portable freezer for use in a home cold storage compartment.

The invention is an improvement over the device shown in my prior patent, No. 2,555,624, which is mounted on the cover of a top opening cold storage compartment. In said patent an electric motor and reduction gear box are secured to the top side of the compartment cover, and the container for the cream to be frozen is suspended from the under side of the cover. An agitator in the container is driven by a shaft passing through a hole in the cover. The foregoing arrangement is effective for its purpose but it requires making a shaft hole in the compartment cover and constitutes a more or less permanent attachment which cannot be conveniently removed when it is not in use. Also, its speed of freezing is not as fast as may be desired for the reason that the cream container is exposed to the warmest stratum of air at the top of the refrigerated compartment.

The general object of the present invention is, therefore, to provide a portable ice cream freezer which can be readily inserted into and removed from a refrigerated compartment.

Another object is to provide an improved ice cream freezer which can be placed in the bottom of any type of refrigerated compartment where the air is coldest, regardless of whether the compartment has a top opening or side opening.

Still another object is to provide an air circulating freezer having conveniently adjustable means to stop the cold air circulation during a final whipping stage while the agitator is still operating.

The invention will be better understood and the accomplishment of these and other objects will be apparent from the following description with reference to the accompanying drawing showing a preferred embodiment of the invention. It is to be understood, however, that the drawing is for illustration only as various changes and modifications may be made within the scope of the appended claims.

This application is a continuation-in-part of Serial No. 323,109, filed November 28, 1952, for Ice Cream Freezer for Use in a Refrigerated Compartment, now abandoned.

In the drawing:

Figure 1 is a small scale perspective view of the entire unit adjusted for a freezing stage;

Figure 2 is a fragmentary vertical section taken along the line 2—2 in Figure 1, but showing the device adjusted for a whipping stage;

Figure 3 is a horizontal section taken along the line 3—3 in Figure 2; and

Figure 4 is a fragmentary section through a scraper blade and the tip of a propeller blade.

Referring in detail to the drawing there are shown portions of a home refrigerator cabinet, including a side wall 10, a bottom 11 and a lid 12 enclosing a freezing compartment 13.

The invention resides in the freezer shown in Figure 1 which has two sections comprising a lower freezing section 14 and an upper power section 15. The lower section 14 includes a cylindrical container 16 whose bottom 17 extends outwardly to an outer shell 18, which is split along a joint 19 and secured by a clamp 20. Radiating from the container 16 are fins 21 which extend from the top of the container 16 down to the bottom 17. Shell 18 has a lower edge 22.

Within the container 16 is a vertical shaft 24, on which are a plurality of mixing propeller blades 25, the upper and lower ones of which are joined by vertical scraper blades 26 which are loosely joined to the tips of the propeller blades 25 by screws 27, as shown in Figure 4. The lower end 28 of the shaft 24 is pointed and rests in a pivot bearing 29 in the bottom 17. The upper end 30 is formed into a flat shank by means of which the shaft 24 can be rotated.

The upper section 15 includes an upper shell 31, within which is mounted a spider frame 32 supporting an electric motor 33 whose cord 34 extends through the shell 31 and out beneath the packing 35 of the lid 12. On the motor shaft 36 is mounted a high velocity fan 37 which, in a freezing stage, draws cold air upwardly between the fins 21 from under the edge 22 and carries it along the outer side of the container 16 past the motor 33 and out through the screen cover 38 of the shell 31.

The motor shaft 36, through the reduction gearing 39, drives a slotted chuck 40 which engages the shaft end 30. Clamps 41 hold the sections 14 and 15 together. Clamps 41 are mounted on a narrow band 43 which is brazed on the upper edge portions of fins 21. The container cover 42 is separately removable.

To make ice cream, a quantity of ice cream mix is placed in the container 16 and the cover 42 is put in place and the unit 15 placed over the unit 14 and clamped in place with shell 18 in its upper position shown in Figure 1. Then, when the lid 12 is closed and the motor 33 operated, large quantities of cold air will be drawn around the mix which is being agitated by the blades 25 and scraper blades 26, making it possible to pump heat from the mix at a high rate of speed, resulting in a well aerated and smoothly frozen cream. By forcibly circulating cold air through the freezer from the very bottom of the refrigerated cabinet, the freezing time is greatly reduced and the quality of the cream improved.

As soon as the cream is frozen, and before it has become hard, the shell 18 is dropped to its Figure 2 position by loosening clamp 20. This closes the air inlet under edge 22 and prevents hardening of the mix while the agitator continues to operate in a whipping stage. The whipping stage introduces air into the ice cream to further improve the quality of the product and prevent an undesirably hard consistency. Air admitted between the top edge of shell 18 and band 43 in Figure 2 will cool the motor but will not harden the mix because the circulating air then comes into contact with only the very top portion of container 16 and fins 21, the rest of the container being surrounded by a dead air chamber which tends to insulate the container from the cold air in the refrigerator cabinet.

It is not essential that the top edge of shell 18 drop below band 43 in the Figure 2 position since the same result may be achieved in other ways, as by causing the top portion of the shell to extend high enough to cover and uncover openings in band 43 when the shell is moved up and down. Other suitable and equivalent valve means for admitting air selectively adjacent the top or bottom of the container 16 will occur to persons skilled in the art. Also, it is not essential to provide top inlet openings in any form as the motor may be designed and arranged to operate without such ventilation for a short whipping stage.

Having now described my invention and in what manner the same may be used, what I claim as new and desire to protect by Letters Patent is:

1. A portable, self-contained ice cream freezer for two-stage operation in a refrigerated compartment comprising a motor unit and a cylindrical cream container, means for detachably mounting said motor unit on top of said container, a mixer in said container driven by said motor unit, a fan in said motor unit, a vertical cylindrical shell around said container and spaced therefrom defining an air duct to said fan between said container and said shell, an air inlet to the lower end of said duct for cooling both said container and motor unit, and an air inlet to said motor unit adjacent the upper end of said duct for cooling said motor unit, said shell being bodily movable to different positions on said container for selectively opening either one of said inlets and closing the other to accomplish freezing and whipping stages by the operation of said mixer.

2. A portable, self-contained ice cream freezer for use in a refrigerated compartment comprising a motor unit and a cream container, means for detachably mounting said motor unit on top of said container, a mixer in said container driven by said motor unit, a fan in said motor unit, a shell around said container and spaced therefrom defining an air duct to said fan between said container and said shell, said duct having lateral inlet openings adjacent the bottom of said container for admitting a cold air flow from the bottom to the top of said container to freeze the contents of the container in a freezing stage, and said shell being movable on said container to close said bottom inlet openings for a whipping stage.

3. A freezer as defined in claim 2 arranged so that movement of said shell to close said bottom openings also operates to open an air inlet adjacent the top of said container.

4. A portable, self-contained ice cream freezer for use in a refrigerated compartment comprising a motor unit and a cream container, means for detachably mounting said motor unit on top of said container, a mixer in said container driven by said motor unit, a fan in said motor unit, a vertical shell around said container and spaced therefrom defining an air duct to said fan between said container and said shell, said duct having lateral inlet openings adjacent the bottom of said container for admitting a cold air flow from the bottom to the top of said container to freeze the contents of the container in a freezing stage, and said shell being slidable vertically on said container to close said bottom inlet openings for a whipping stage.

5. A portable, self-contained ice cream freezer for use in a refrigerated compartment comprising a cream container having a peripheral side wall and a flat bottom adapted to support the freezer on the floor of said compartment, fins on said side wall, an outer shell closely surrounding said fins, said fins defining air passages between said side wall and shell extending from the bottom to the top of said container, a rotary mixer in said container having a vertical shaft, a motor unit detachably mounted on the top of said container in detachable driving engagement with said shaft, a fan in said motor unit, a vertical shell surrounding said motor unit and fan, said first shell having top and bottom portions movable on said container to establish lateral air intake openings for said fan either at the bottom or at the top of said container, movement of said first shell portions in one direction closing said top openings and establishing air circulation through said bottom openings and passages to said fan, and movement of said first shell portions in the opposite direction closing said bottom openings and establishing air circulation through said top openings to said fan.

6. A portable, self-contained ice cream freezer for use in a refrigerated compartment comprising a cream container having a peripheral side wall and a flat bottom adapted to support the freezer on the floor of said compartment, fins on said side wall, an outer shell of less height than said container closely surrounding said fins for vertical movement thereon, said fins defining air passages between said side wall and shell extending from the bottom to the top of said container, a rotary mixer in said container having a vertical shaft, a motor unit detachably mounted on the top of said container in detachable driving engagement with said shaft, a fan in said motor unit, a vertical shell surrounding said motor unit and fan, said first shell being vertically movable on said fins to an upper position providing lateral air intake openings at the bottom of said container for induced air circulation through said passages and motor unit shell, and said first shell being vertically movable on said fins to a lower position closing said bottom intake openings and providing an air intake for said fan at the top of said container.

References Cited in the file of this patent

UNITED STATES PATENTS

| | | |
|---|---|---|
| 2,252,043 | Sissel | Aug. 12, 1941 |
| 2,382,084 | Mathews | Aug. 14, 1945 |
| 2,491,952 | Calmes | Dec. 20, 1949 |
| 2,506,448 | Gregor | May 2, 1950 |
| 2,555,624 | Anderson | June 5, 1951 |